(12) United States Patent  (10) Patent No.: US 8,017,265 B2
Park et al.  (45) Date of Patent: Sep. 13, 2011

(54) CAN HAVING ELECTROLYTE SLOTS AND LITHIUM SECONDARY BATTERY USING THE SAME

(75) Inventors: Jeong Man Park, Yongin-si (KR); Yoon Tai Kwak, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 967 days.

(21) Appl. No.: 11/410,516

(22) Filed: Apr. 24, 2006

(65) Prior Publication Data

US 2006/0263679 A1  Nov. 23, 2006

(30) Foreign Application Priority Data

Apr. 25, 2005 (KR) .................. 10-2005-0034230

(51) Int. Cl.
*H01M 2/00* (2006.01)
*H01M 2/02* (2006.01)
(52) U.S. Cl. ..................................... 429/163; 429/176
(58) Field of Classification Search .................. None
See application file for complete search history.

(56) References Cited

U.S. PATENT DOCUMENTS

| | | | | |
|---|---|---|---|---|
| 2,199,229 A | * | 4/1940 | Smith | 429/186 |
| 2,385,127 A | * | 9/1945 | Carlile | 429/163 |
| 2,621,221 A | * | 12/1952 | De Munck | 429/100 |
| 4,168,350 A | * | 9/1979 | Oxenreider et al. | 429/87 |
| 5,556,722 A | * | 9/1996 | Narukawa et al. | 429/163 |

FOREIGN PATENT DOCUMENTS

| | | |
|---|---|---|
| JP | 2003-249269 | 9/2003 |
| JP | 2004-179159 | 6/2004 |
| JP | 2005-174563 | 6/2005 |
| KR | 10-2003-0047040 A | 6/2003 |

OTHER PUBLICATIONS

English machine translation of Japanese publication No. 2003-249269, dated May 9, 2003 in the name of Wada.
English machine translation of Japanese publication No. 2004-179159, dated Jun. 24, 2004 in the name of Kasahara et al.
English machine translation of Japanese publication No. 2005-174563, dated Jun. 30, 2005 in the name of Nishimura et al.

\* cited by examiner

*Primary Examiner* — Barbara L Gilliam
*Assistant Examiner* — Kwang Han
(74) *Attorney, Agent, or Firm* — Christie, Parker & Hale, LLP (57) ABSTRACT

A can and a lithium secondary battery using the same. Electrolyte slots having predetermined shapes are formed at inner surfaces of short-sidewalls and a bottom wall of the can, and serve as an electrolyte path or an electrolyte receiving space, thereby allowing the electrolyte to be easily introduced into the can even if a jellyroll-type electrode assembly has been accommodated in the can, and increasing an amount of the electrolyte contained in the can.

20 Claims, 12 Drawing Sheets

CAN HAVING ELECTROLYTE SLOTS AND LITHIUM SECONDARY BATTERY USING THE SAME

CROSS-REFERENCE TO RELATED APPLICATION

This application claims priority to and the benefit of Korean Patent Application No. 2005-0034230 filed in the Korean Intellectual Property Office on Apr. 25, 2005, the entire content of which is incorporated herein by reference.

BACKGROUND OF THE INVENTION

1. Field of the Invention

The invention relates to a can and a lithium secondary battery using the same. More particularly, the invention relates to a can and a lithium secondary battery using the same wherein electrolyte can be easily introduced into the can even if a jellyroll-type electrode assembly has been accommodated in the can, and the amount of the electrolyte contained in the can may be increased.

2. Description of the Prior Art

Recently, light-weight portable wireless appliances, such as video cameras, portable phones and portable computers, have been fabricated and equipped with various functions, and studies have been actively performed in relation to secondary batteries used as power sources for the portable wireless appliances. For instance, the secondary batteries include Ni—Cd batteries, Ni-MH batteries, Ni—Zn batteries and lithium secondary batteries. Among other things, the lithium secondary batteries are rechargeable batteries, which can be compact in size with high capacity. The lithium secondary batteries can deliver high operational voltage and high energy density per unit weight, so the lithium secondary batteries are extensively used in the advanced electronic technology fields.

Figure 1:
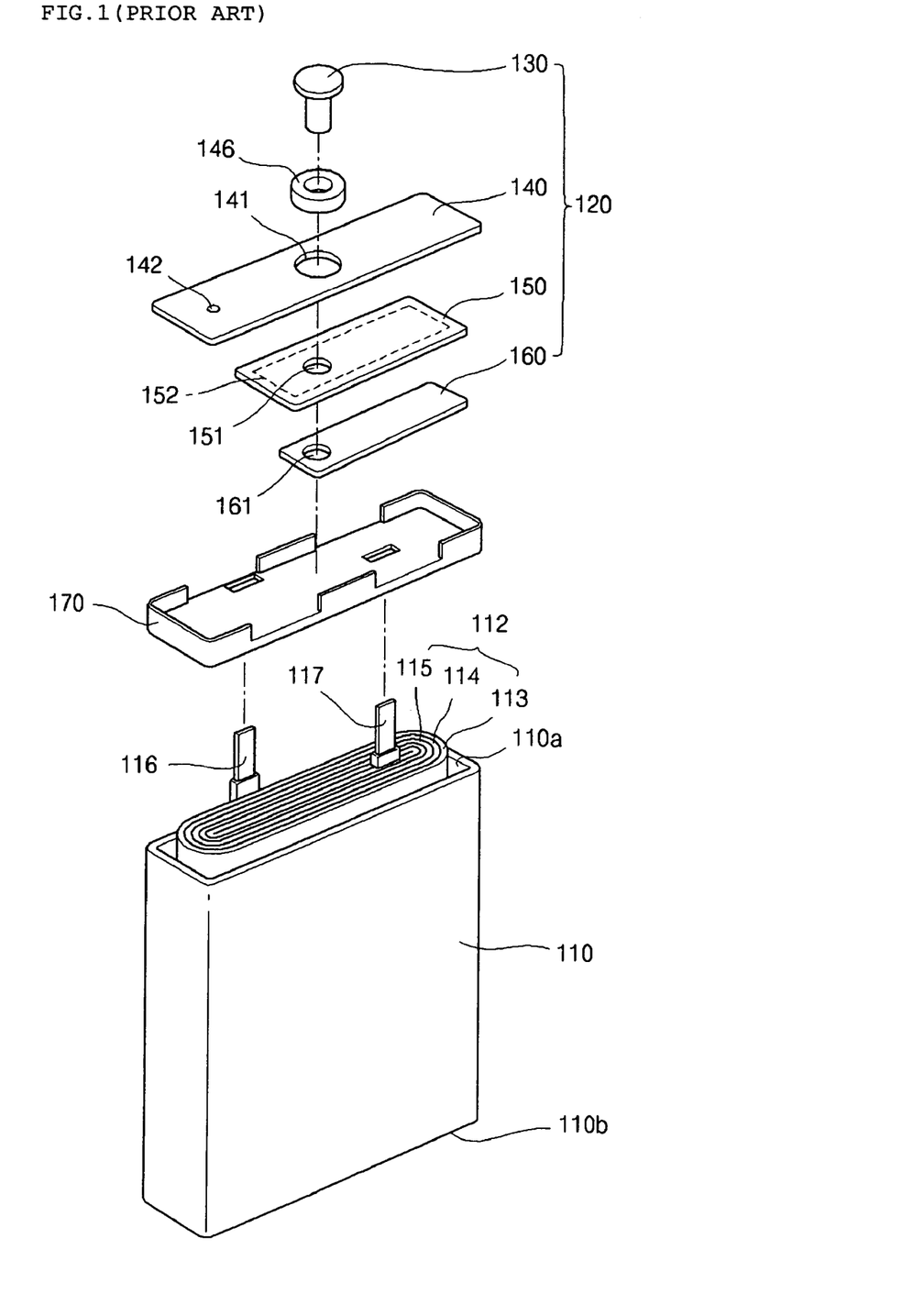
FIG. 1 is an exploded perspective view illustrating a conventional lithium secondary battery.

FIG. 1 is an exploded perspective view illustrating a conventional lithium secondary battery.

The conventional lithium secondary battery can be obtained by accommodating an electrode assembly 112 including a positive electrode plate 113, a negative electrode plate 115 and a separator 114 in a can 110 together with an electrolyte, and then sealing an upper opening 110a of the can 110 using a cap assembly 120.

In general, the can 110 is made from aluminum or an aluminum alloy through a deep drawing process. In addition, a lower surface 110b of the can 110 is substantially planar.

The electrode assembly 112 is formed by winding the positive electrode plate 113 together with the negative electrode plate 115 while interposing the separator 114 therebetween. A positive electrode tap 116 is coupled to the positive electrode plate 113 and an end portion of the positive electrode tap 116 protrudes upward from the electrode assembly 112. A negative electrode tap 117 is coupled to the negative electrode plate 115 and an end portion of the negative electrode tap 117 protrudes upward from the electrode assembly 112. The positive electrode tap 116 is spaced apart from the negative electrode tap 117 by a predetermined distance such that the positive electrode tap 116 can be electrically insulated from the negative electrode tap 117. In general, the positive and negative electrode taps 116 and 117 are made from nickel.

The cap assembly 120 includes a cap plate 140, an insulating plate 150, a terminal plate 160 and an electrode terminal 130. The cap assembly 120 is accommodated in an insulating case 170 and assembled to couple with the upper opening 110a of the can 110, thereby sealing the can 110.

The cap plate 140 is made from a metal plate having a size and a shape corresponding to those of the upper opening 110a of the can 110. The cap plate 140 is formed at the center thereof with a first terminal hole 141 having a predetermined size and the electrode terminal 130 is inserted into the first terminal hole 141. When the electrode terminal 130 is inserted into the first terminal hole 141, a gasket tube 146 is fitted around the electrode terminal 130 in order to insulate the electrode terminal 130 from the cap plate 140. An electrolyte injection hole 142 having a predetermined size is formed at one side of the cap plate 140. After the cap assembly 120 has been assembled with the upper opening 110a of the can 110, the electrolyte is injected into the can 110 through the electrolyte injection hole 142. Then, the electrolyte injection hole 142 is sealed by means of a plug (not shown).

The electrode terminal 130 is connected to the negative electrode tap 117 of the negative electrode plate 115 or the positive electrode tap 116 of the positive electrode plate 113 so that the electrode terminal 130 may serve as a negative electrode terminal or a positive electrode terminal.

The insulating plate 150 is made from an insulating material identical to the material for the gasket and is coupled with the lower surface of the cap plate 140. The insulating plate 150 is formed with a second terminal hole 151, which is aligned corresponding to the first terminal hole 141 of the cap plate 140 and into which the electrode terminal 130 is inserted. The insulating plate 150 is formed on the lower surface thereof with a resting recess 152 having a size and a shape corresponding to those of the terminal plate 160 such that the terminal plate 160 can be rested in the resting recess 152.

The terminal plate 160 is made from a Ni alloy and is coupled with the lower surface of the insulating plate 150. The terminal plate 160 is formed with a third terminal hole 161, which is aligned corresponding to the first terminal hole 141 of the cap plate 140 and into which the electrode terminal 130 is inserted. Since the electrode terminal 130 is inserted into the first terminal hole 141 of the cap plate 140 and is insulated from the terminal plate 140 by means of the gasket tube 146, the terminal plate 160 can be electrically connected to the electrode terminal 130 while being electrically insulated from the cap plate 140.

The negative electrode tap 117 coupled to the negative electrode plate 115 is welded to one side of the terminal plate 160, and the positive electrode tap 116 coupled to the positive electrode plate 113 is welded to other side of the cap plate 140. The negative and positive electrode taps 117, 116 are welded to the terminal plate 160 and the cap plate 140 through resistance welding or laser welding. In general, the resistance welding is employed.

Recently, in order to obtain a lithium secondary battery having high capacity, the area of the electrode plate of the electrode assembly was enlarged, the winding number for the electrode assembly was increased, and the thickness of the electrode assembly was enlarged. However, if the thickness of the electrode assembly is increased, it is difficult to ensure a sufficient gap between the electrode assembly and the can when the electrode assembly has been accommodated in the can. In this case, it is difficult to inject the electrolyte into the can after the cap assembly has been welded to the upper portion of the can having the electrode assembly because the electrolyte may not uniformly flow into the can. In addition, when the electrode assembly has been accommodated in the can, only a small empty space is formed in the can, so the amount of electrolyte contained in the can is reduced.

SUMMARY OF THE INVENTION

Accordingly, the invention has been made to solve one or more of the above-mentioned problems occurring in the prior art, and an embodiment of the claimed invention is to provide a can and a lithium secondary battery using the same, in which electrolyte slots having predetermined shapes are formed at inner surfaces of short-sidewalls and on a bottom wall of the can, and serve as an electrolyte path or an electrolyte receiving space, thereby allowing the electrolyte to be easily introduced into the can even if a jellyroll-type electrode assembly has been accommodated in the can, and increasing the amount of the electrolyte contained in the can.

In one embodiment of the invention, a can is provided for a lithium secondary battery, the battery including an electrode assembly having a first electrode plate, a second electrode plate and a separator interposed between the first and second electrode plate, and a cap assembly having a cap plate and sealing the can, the can comprising: long-sidewalls; short-sidewalls; and a bottom wall, wherein the can receives the electrode assembly therein through an opening formed at an upper end portion of the can, the opening is sealed by the cap assembly, and the short-sidewalls are formed at inner surfaces thereof with at least one electrolyte slot having a predetermined shape. In an embodiment, a plurality of electrolyte slots are formed in the form of trenches, which extend from upper end portions of the short-sidewalls to lower end portions of the short-sidewalls while being spaced apart from each other at a predetermined interval. In one embodiment, the trenches can be prepared in the form of diagonal trenches, vertical trenches, or horizontal trenches with respect to the orientation of the short-sidewalls. In another embodiment, a horizontal section of the electrolyte slot has a rectangular, a triangular or an arc shape. In a further embodiment, when the horizontal section of the electrolyte slot has the rectangular or the triangular shape, inner corners of the electrolyte slot formed at a bottom wall of the electrolyte slot are rounded with predetermined curvature. In one embodiment, outer edges of the electrolyte slots, which are connected to the short-sidewalls, are also rounded with a predetermined curvature, and in one embodiment, the electrolyte slot may have a width of at least 2 mm and an interval between the electrolyte slots is at least 2 mm.

According to one embodiment of the invention, the can is formed at an inner portion of the opening thereof with a recess having a predetermined depth for resting the cap plate therein and the electrolyte slot extends downward from a lower surface of the recess. At this time, the predetermined depth of the recess corresponds to a thickness of the cap plate. The cap plate can be provided at a lower surface thereof with a can coupling member, which has a size corresponding to a size of the opening of the can and is coupled with the opening of the can, and the predetermined depth of the recess corresponds to a thickness of the can coupling member.

According to one embodiment of the invention, a plurality of electrolyte slots are discontinuously formed at inner surfaces of the short-sidewalls, and the electrolyte slots may have rectangular, triangular, circular or semi-spherical sectional shapes. When the electrolyte slots have rectangular or triangular sectional shapes, inner corners of the electrolyte slots formed at bottom walls of the electrolyte slots are rounded with a predetermined curvature. In addition, outer edges of the electrolyte slots, which are connected to the short-sidewalls, are also rounded with a predetermined curvature. In one embodiment, the electrolyte slot may have a width or a diameter of at least 2 mm and the interval between the electrolyte slots is at least 2 mm, and a depth of the electrolyte slot is less than 50% of a thickness of the short-sidewall of the can.

In one embodiment, the bottom wall of the can is formed at an upper surface thereof with at least one electrolyte slot having a predetermined shape that is rectangular, triangular, circular or semi-spherical sectional in shape. When the electrolyte slots have rectangular or triangular sectional shapes, inner corners of the electrolyte slots formed at bottom walls of the electrolyte slots are rounded with a predetermined curvature. In an embodiment, outer edges of the electrolyte slots, which are connected to the short-sidewalls, are rounded with a predetermined curvature, and the interval between the electrolyte slots is at least 2 mm, and the width or the diameter of the electrolyte slot is at least 2 mm. In addition, the depth of the electrolyte slot formed at the bottom wall of the can is less than 50% of the thickness of the bottom wall of the can.

According to another embodiment of the invention, a lithium secondary battery is provided comprising: an electrode assembly including a first electrode plate, a second electrode plate and a separator interposed between the first and second electrode plate; and a can formed at an upper end portion thereof with an opening through which the electrode assembly is accommodated in the can, wherein electrolyte slots having a predetermined shape are formed at inner surfaces of short-sidewalls of the can. The electrolyte slot has a shape as described above. The first electrode plate serves as a negative electrode plate and the second electrode plate serves as a positive electrode plate.

BRIEF DESCRIPTION OF THE DRAWINGS

The above and other features and advantages of the claimed invention will be more apparent from the following detailed description taken in conjunction with the accompanying drawings.

FIG. 3b is a sectional view taken along line A-A shown in FIG. 3a;

FIG. 7b is a longitudinal sectional view of a can shown in FIG. 7a;

FIG. 7c is a front view of a cap plate coupled with the can for a lithium secondary battery shown in FIG. 7a;

FIG. 8b is a sectional view taken along line B-B shown in FIG. 8a.

DETAILED DESCRIPTION

Hereinafter, embodiments of the invention will be described with reference to the accompanying drawings. In the following description and drawings, the same reference numerals are used to designate the same or similar components, so repetition of the description on the same or similar components will be omitted.

Figure 2:
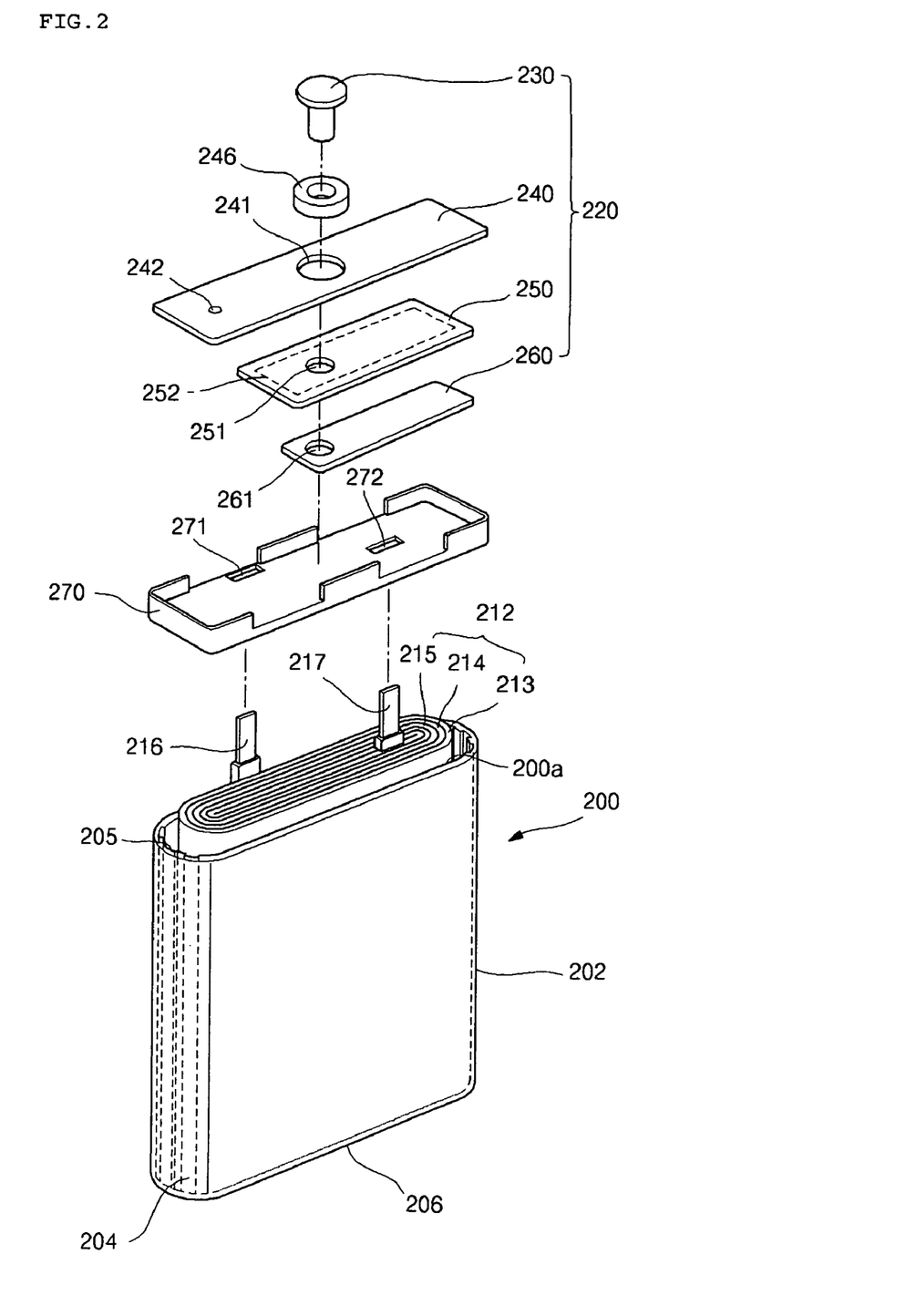
FIG. 2 is an exploded perspective view illustrating a lithium secondary battery according to one embodiment of the invention.

Referring to FIG. 2, the lithium secondary battery according to the invention includes a can 200, an electrode assembly 212 accommodated in the can 200, and a cap assembly 220 assembled with an upper end portion of the can 200 in order to seal an upper opening 200a of the can 200.

Figure 3A:
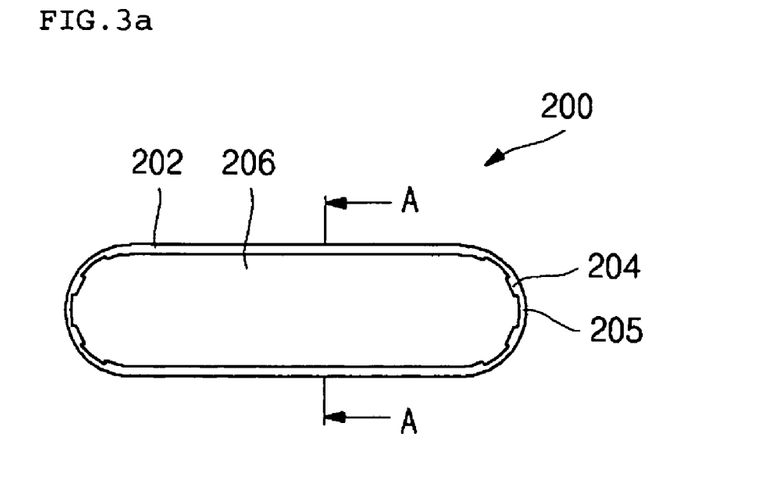
FIG. 3a is a plan view of a can shown in FIG. 2.
Figure 3B:
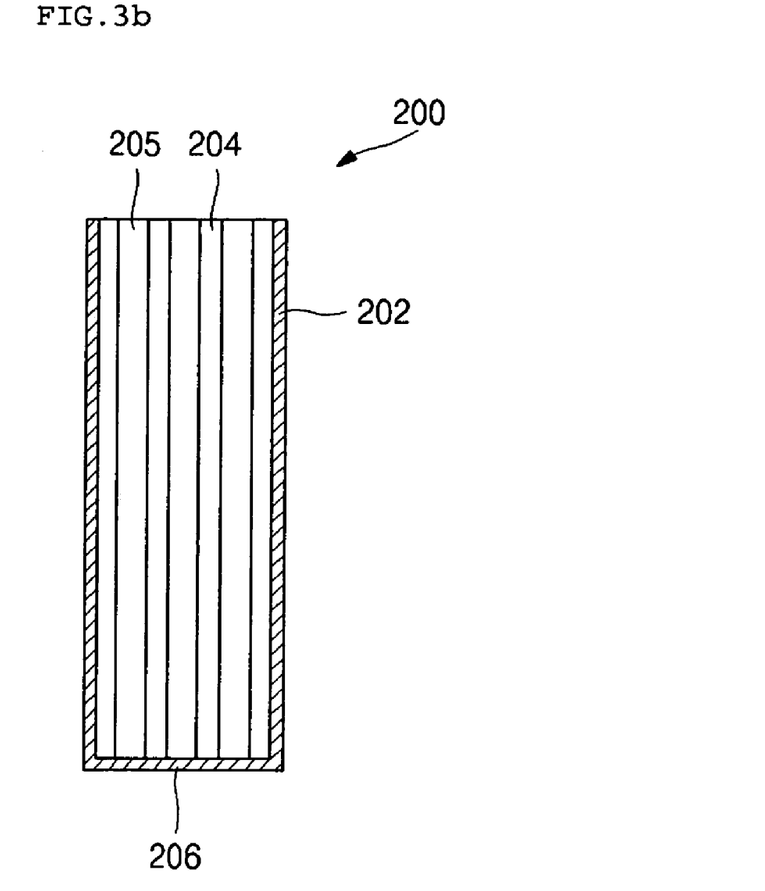

As shown in FIGS. 2, 3a and 3b, the can 200 is fabricated in the form of a box including long-sidewalls 202, short-sidewalls 204 and a bottom wall 206, in which an upper portion of the can 200 is formed with an opening 200a through which the electrode assembly 212 is accommodated in the can 200. In detail, the can 200 is provided with sidewalls consisting of the long-sidewalls 202 having relatively larger widths and short-sidewalls 204 having relatively smaller widths. As shown in FIG. 3a, the long-sidewalls 202 are spaced apart from each other by a predetermined distance while facing each other, thereby forming front and rear surfaces of the can 200. In addition, the short-sidewalls 204 are spaced apart from each other by a predetermined distance while facing each other, thereby forming lateral surfaces of the can 200. In an embodiment, the short-sidewalls 204 are curved corresponding to the lateral profile of the electrode assembly 212. However, it is also possible to form the short-sidewalls 204 in a planar shape. If the short-sidewalls 204 are formed in the curved shape, a horizontal section of the can 200 has a substantially oval shape. The bottom wall 206 of the can 200 may form a lower surface of the can 200. In addition, in one embodiment, each sidewall of the can 200 has a thickness of about 0.2 to 1.0 mm, and in general, the bottom wall 206 has a thickness larger than that of the long-sidewalls 202 and the short-sidewalls 204.

Figure 3C:
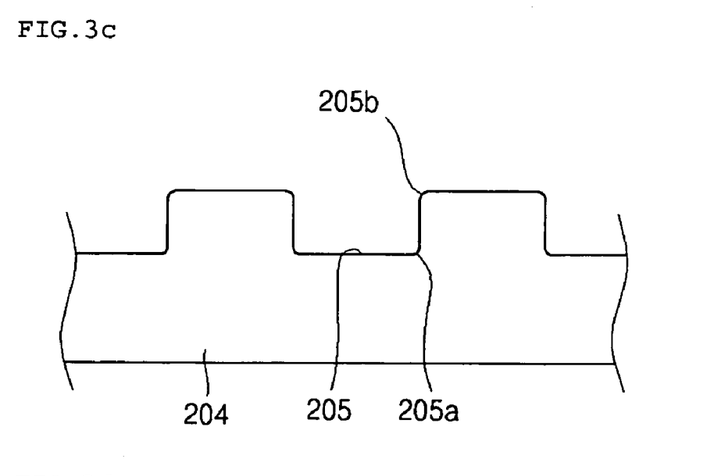
FIG. 3c is an enlarged plan view of an electrolyte slot shown in FIG. 2.
Figure 3D:
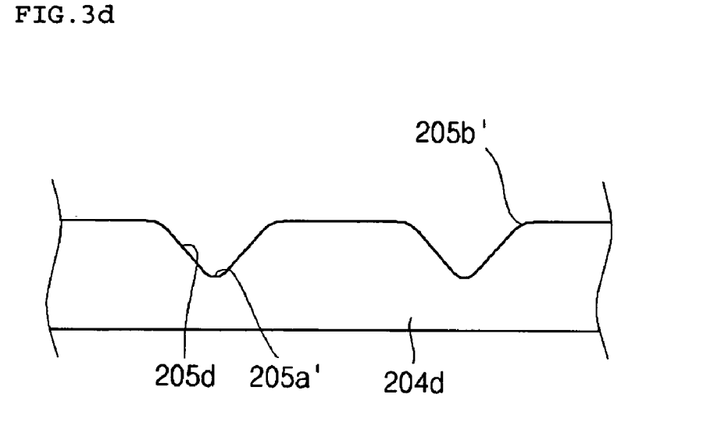
FIG. 3d is an enlarged plan view of a triangular electrolyte slot according to one embodiment of the invention.
Figure 3E:
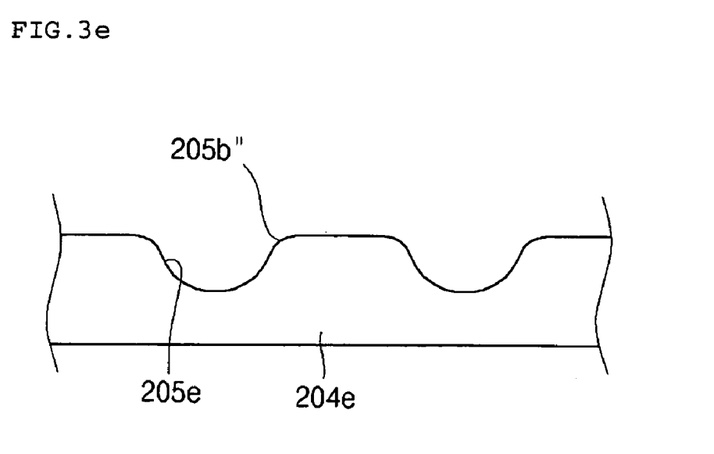
FIG. 3e is an enlarged plan view of a circular electrolyte slot according to one embodiment of the invention.

In an additional embodiment, the short-sidewalls 204 are formed at inner surfaces thereof with electrolyte slots 205 having predetermined shapes. In detail, as shown in FIGS. 3a to 3c, the electrolyte slots 205 are prepared in the form of trenches, which extend from upper end portions of the short-sidewalls 204 to lower end portions of the short-sidewalls 204, that is, to an upper surface of the bottom wall 206. Accordingly, when the electrolyte is injected into the can 200 having the electrode assembly 212 therein, after the cap assembly 220 has been welded to the upper end portion of the can 200, the electrolyte can be easily introduced into the can 200 along the electrolyte slots 205. In addition, since the electrolyte slots 205 are filled with the electrolyte that has been injected into the can 200, an amount of the electrolyte contained in the can 200 may be increased. In one embodiment, horizontal sections of the electrolyte slots 205 may have rectangular, triangular or arc shapes; however, the invention is not limited thereto. Herein, the horizontal section refers to a section of the electrolyte slot 205 obtained by cutting the electrolyte slot 205 parallel to the bottom wall 206 of the can 200. As shown in FIG. 3c, on short-sidewall 204, when the electrolyte slot 205 has a rectangular section, inner corners 205a of the electrolyte slot 205 defined between the sidewalls and a bottom wall of the electrolyte slot 205 are rounded with a predetermined curvature, and outer edges 205b are rounded. As shown in FIG. 3d, on short-sidewall 204d, when the electrolyte slot 205d has a triangular section, inner corners 205a' of the electrolyte slot 205d defined between the sidewalls and a bottom wall of the electrolyte slot 205d are rounded with a predetermined curvature, and outer edges 205b' are rounded. On short-sidewall 204e, a circular electrolyte slot 205e is shown in FIG. 3e according to an embodiment of the invention, with outer edges 205b" rounded. As shown in FIG. 3c, if the inner corners 205a of the electrolyte slots 205 are angularly formed in a vertical angle without being rounded, cracking may occur at the inner corners 205a of the electrolyte slots 205 as the can 200 repeats expansion and shrinkage during the operation of the lithium secondary battery. Thus, in one embodiment, the inner corners 205a of the electrolyte slot 205 may be rounded, and outer edges 205b of the electrolyte slot 205 defined between sidewalls of the electrolyte slot 205 and the inner surfaces of the short-sidewalls 204 are also rounded with a predetermined curvature. If the upper edges 205b of the electrolyte slots 205 are angularly formed in a vertical angle without being rounded, the electrode assembly 212 may be damaged by the upper edges 205b while the electrode assembly 212 is being accommodated in the can 200 or the lithium secondary battery is being operated, thereby causing the short circuit between the electrode plates. Herein, the vertical angle refers to an angle formed between two planes, which linearly cross each other.

In addition, in an embodiment, the electrolyte slot 205 has a width of at least 2 mm. If the width of the electrolyte slot 205 is too small, the electrolyte injected into the can 200 may not easily flow along the electrolyte slot 205. In addition, the interval between the electrolyte slots 205 is at least 2 mm. If the interval between the electrolyte slots 205 is too short, predetermined portions of the short-sidewalls 204 located between the electrolyte slots 205 may act as protrusions, which locally apply pressure to the electrode assembly 212, thereby causing damage to the electrode assembly 212. In an extreme case, the protrusions cause a short circuit between the electrode plates.

In one embodiment, the electrolyte slot 205 may have a depth less than 50% of the thickness of the short-sidewall 204 of the can 200. If the depth of the electrolyte slot 205 exceeds 50% of the thickness of the short-sidewall 204 of the can 200, the strength of the can 200 may be lowered, so that the can 200 is weak against external pressure or impact applied thereto and swelling is created in the can 200 during the operation of the lithium secondary battery.

The electrode assembly 212 of one embodiment includes a first electrode plate 215, a second electrode plate 213 and a separator 214. The first and second electrode plates 215 and 213 are stacked by interposing the separator 214 therebetween and then wound in the form of a jellyroll. A second electrode tap 216 is welded to the second electrode plate 213 and an end portion of the second electrode tap 216 protrudes upward from the electrode assembly 212. A first electrode tap 217 is welded to the first electrode plate 215 and an end portion of the first electrode tap 217 protrudes upward from the electrode assembly 212. In an embodiment, the first electrode plate 215 serves as a negative electrode plate, and the second electrode plate 213 serves as a positive electrode plate, however, it is also possible to form the first electrode plate 215 as the positive electrode plate and the second electrode plate 213 as the negative electrode plate.

In an embodiment, the cap assembly 220 includes a cap plate 240, an insulating plate 250, a terminal plate 260 and an electrode terminal 230. The cap assembly 220 is accommodated in an insulating case 270 and coupled with the upper opening 200a of the can 200 so as to seal the can 200.

In an embodiment, the cap plate 240 is made from a metal plate having a size and a shape corresponding to those of the upper opening 200a of the can 200, and the cap plate 240 may be made from aluminum or an aluminum alloy having light weight. The cap plate 240 is formed at the center thereof with a first terminal hole 241 having a predetermined size. An electrolyte injection hole 242 is formed at one side of the cap plate 240.

The first terminal hole 241 has an inner diameter larger than an outer diameter of the electrode terminal 230 so that the electrode terminal 230 can be easily inserted into the first terminal hole 241. A gasket tube 246 is fitted in the first terminal hole 241 so as to insulate the electrode terminal 230 from the cap plate 240.

As mentioned above, the electrolyte injection hole 242 is formed at one side of the cap plate 240 with a predetermined size. After the cap assembly 220 has been assembled with the upper opening 200a of the can 200, the electrolyte is injected into the can 200 through the electrolyte injection hole 242. Then, the electrolyte injection hole 242 is sealed by means of a separate sealing member.

The insulating plate 250 is made from an insulating material identical to the material for the gasket and includes a bottom plate 252, and sidewalls protruding downward from each lateral side of a lower surface of the bottom plate 252. In addition, the insulating plate 250 is formed at a predetermined portion thereof with a second terminal hole 251. The insulating plate is coupled to a lower surface of the cap plate 240 and the bottom plate 252 has a size corresponding to that of the terminal plate 260.

In an embodiment, the second terminal hole 251 is aligned corresponding to the first terminal hole 241 of the cap plate 240 when the insulating plate 250 is coupled with the cap plate 240 such that the electrode terminal 230 can be inserted into the second terminal hole 251 through the first terminal hole 241. In another embodiment, the second terminal hole 251 may be biased from the center of the insulating plate 250.

In one embodiment, the terminal plate 260 is made from Ni or a Ni alloy and coupled to the lower surface of the bottom plate 252 of the insulating plate 250. The terminal plate 260 is formed with a third terminal hole 261, which is aligned corresponding to the first terminal hole 241 of the cap plate 240 and into which the electrode terminal 230 is inserted.

The electrode terminal 230 is coupled with the terminal plate 260 by passing through the first, second and third terminal holes 241, 251, 261 while being insulated from the cap plate 240 by means of the gasket tube 246. Accordingly, the terminal plate 260 of the cap assembly 220 is electrically insulated from the cap plate 240 while being electrically connected to the electrode terminal 230.

The insulating case 270 is formed with first and second electrode tap holes 272, 271. The insulating case 270 is coupled to a lower portion of the cap assembly 220 so as to electrically insulate the cap assembly 220 from the electrode assembly 212. The second electrode tap 216 is coupled to the cap plate 240 by passing through the second electrode tap hole 271. In addition, the first electrode tap 217 is coupled to the terminal plate 260 by passing through the first electrode tap hole 272.

Figure 4:
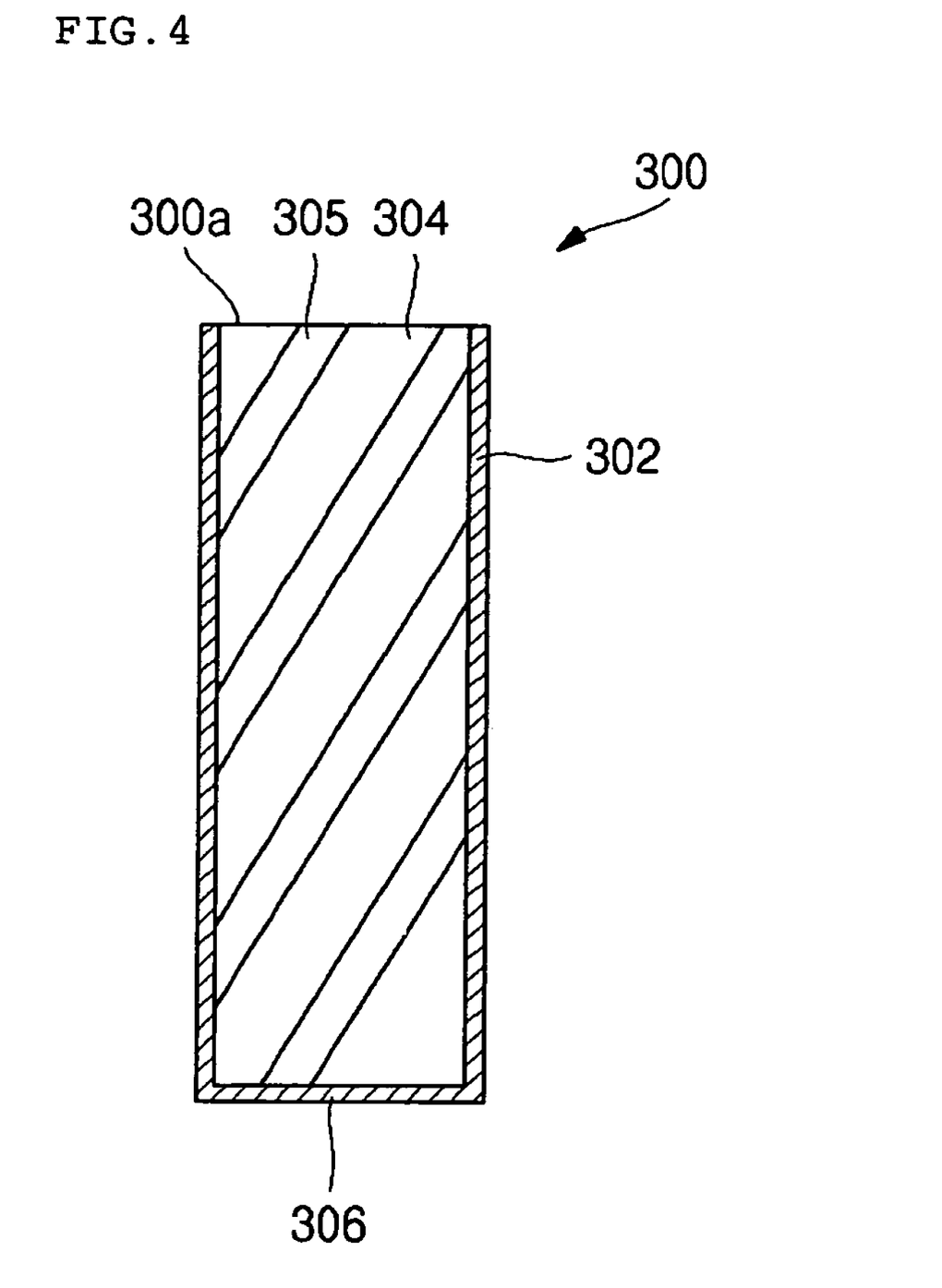
FIG. 4 is a sectional view illustrating a can for a lithium secondary battery according to another embodiment of the invention.

FIG. 4 is a sectional view illustrating a can for a lithium secondary battery according to another embodiment of the invention. The can 300 is fabricated in the form of a box including long-sidewalls 302, short-sidewalls 304 and a bottom wall 306, in which an upper portion of the can 300 is formed with an opening 300a. The short-sidewalls 304 are formed at inner surfaces thereof with a plurality of electrolyte slots 305. The electrolyte slots 305 are prepared in the form of diagonal trenches, which extend from upper end portions of the short-sidewalls 304 to lower end portions of the short-sidewalls 304, that is, to an upper surface of the bottom wall 306. The electrolyte slots 305 according to another embodiment of the invention are substantially identical to the electrolyte slots 205 shown in FIGS. 3a to 3c, except that the electrolyte slots 305 are diagonally formed at the inner surfaces of the short-sidewalls 304. Thus, detailed description in relation to the shape of the electrolyte slots 305 will be omitted below. However, in one embodiment, it should be noted that the interval between the electrolyte slots 305 refers to the distance between the electrolyte slots 305 in the direction perpendicular to the extension direction of the electrolyte slots 305, and the interval is at least 2 mm.

Figure 5:
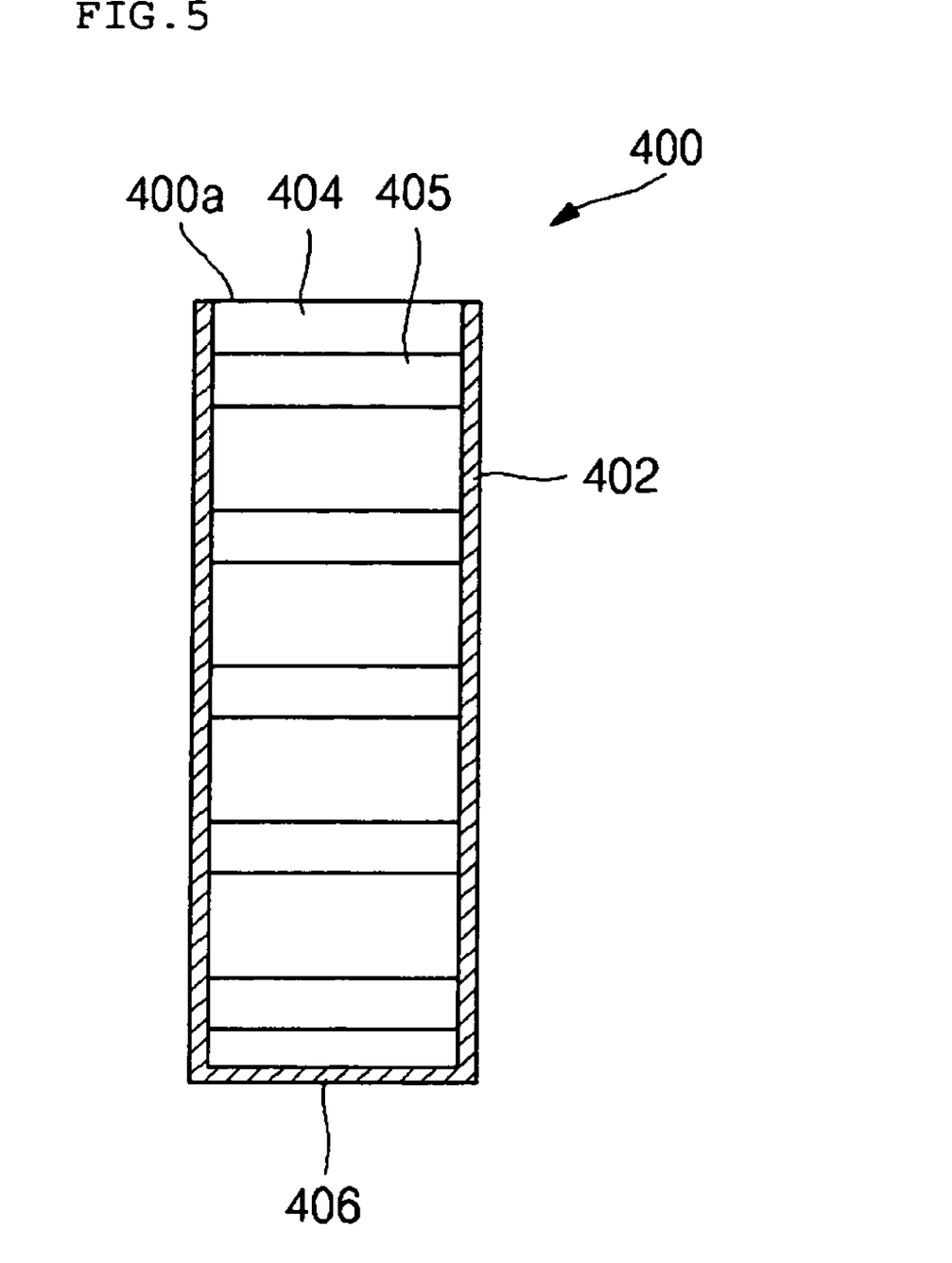
FIG. 5 is a sectional view illustrating a can for a lithium secondary battery according to still another embodiment of the invention.

FIG. 5 is a sectional view illustrating a can for a lithium secondary battery according to still another embodiment of the invention. The can 400 according to still another embodiment of the invention is fabricated in the form of a box including long-sidewalls 402, short-sidewalls 404 and a bottom wall 406, in which an upper portion of the can 400 is formed with an opening 400a. The short-sidewalls 404 are formed at inner surfaces thereof with a plurality of electrolyte slots 405. The electrolyte slots 405 are prepared in the form of horizontal trenches. The electrolyte slots 405 according to still another embodiment of the invention are substantially identical to the electrolyte slots 205 shown in FIGS. 3a to 3c, except that the electrolyte slots 405 are horizontally formed at the inner surfaces of the short-sidewalls 404. Thus, a detailed description in relation to the shape of the electrolyte slots 405 will be omitted below. However, it should be noted that in one embodiment, the interval between the electrolyte slots 405 refers to the distance between the electrolyte slots 405 in the direction perpendicular to the extension direction of the electrolyte slots 405, that is, in the longitudinal direction of the short-sidewalls 404, and the interval is at least 2 mm.

Figure 6A:
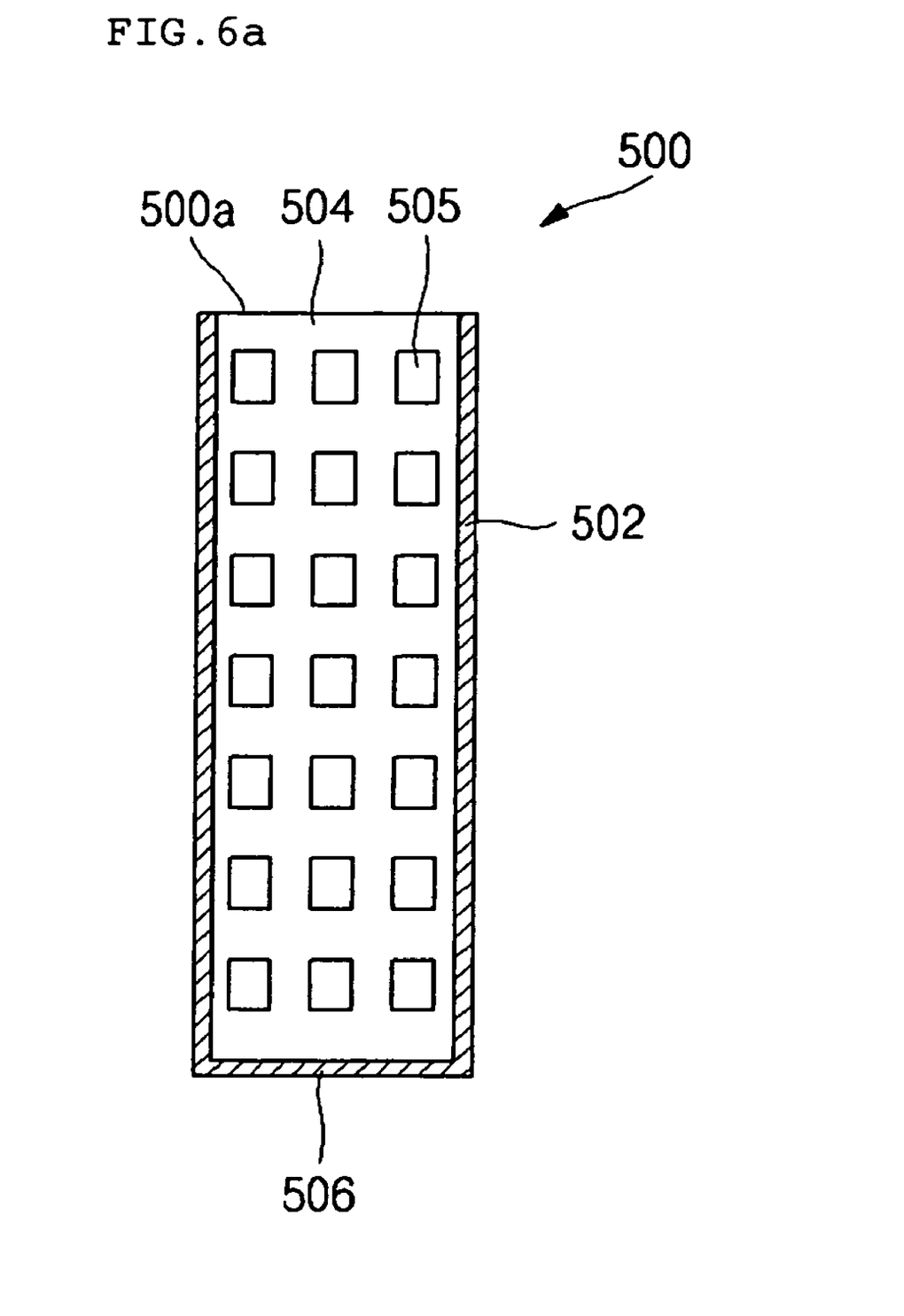
FIG. 6a is a sectional view illustrating a can for a lithium secondary battery according to still yet another embodiment of the invention.
Figure 6B:
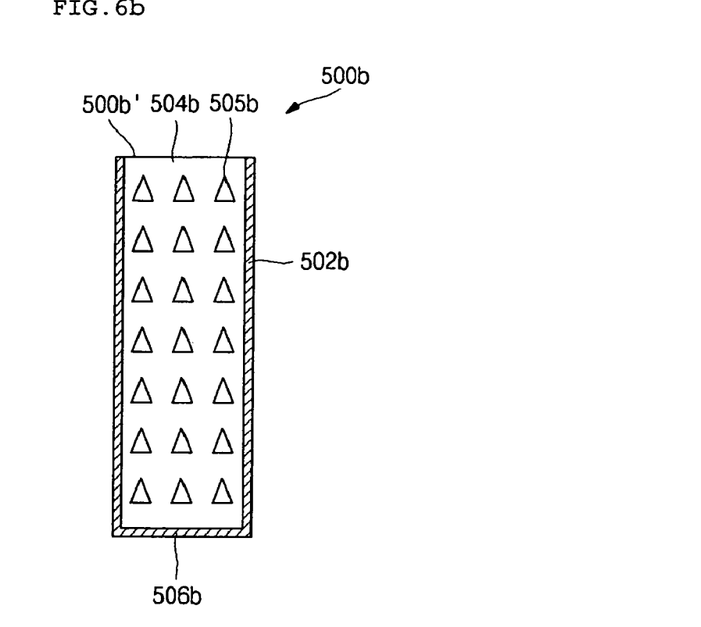
FIG. 6b is a sectional view illustrating a can for a lithium secondary battery according to one embodiment of the invention.
Figure 6C:
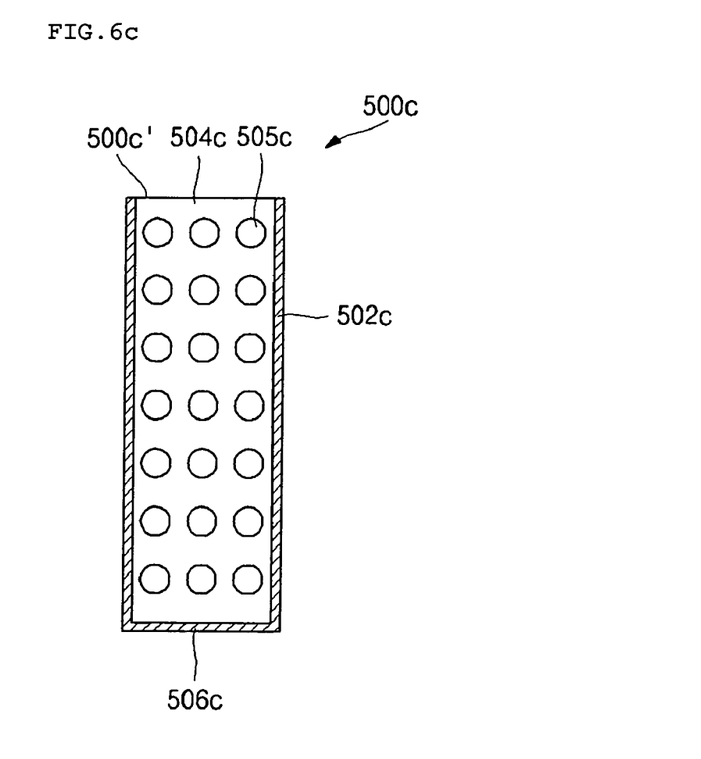
FIG. 6c is a sectional view illustrating a can for a lithium secondary battery according to one embodiment of the invention.
Figure 6D:
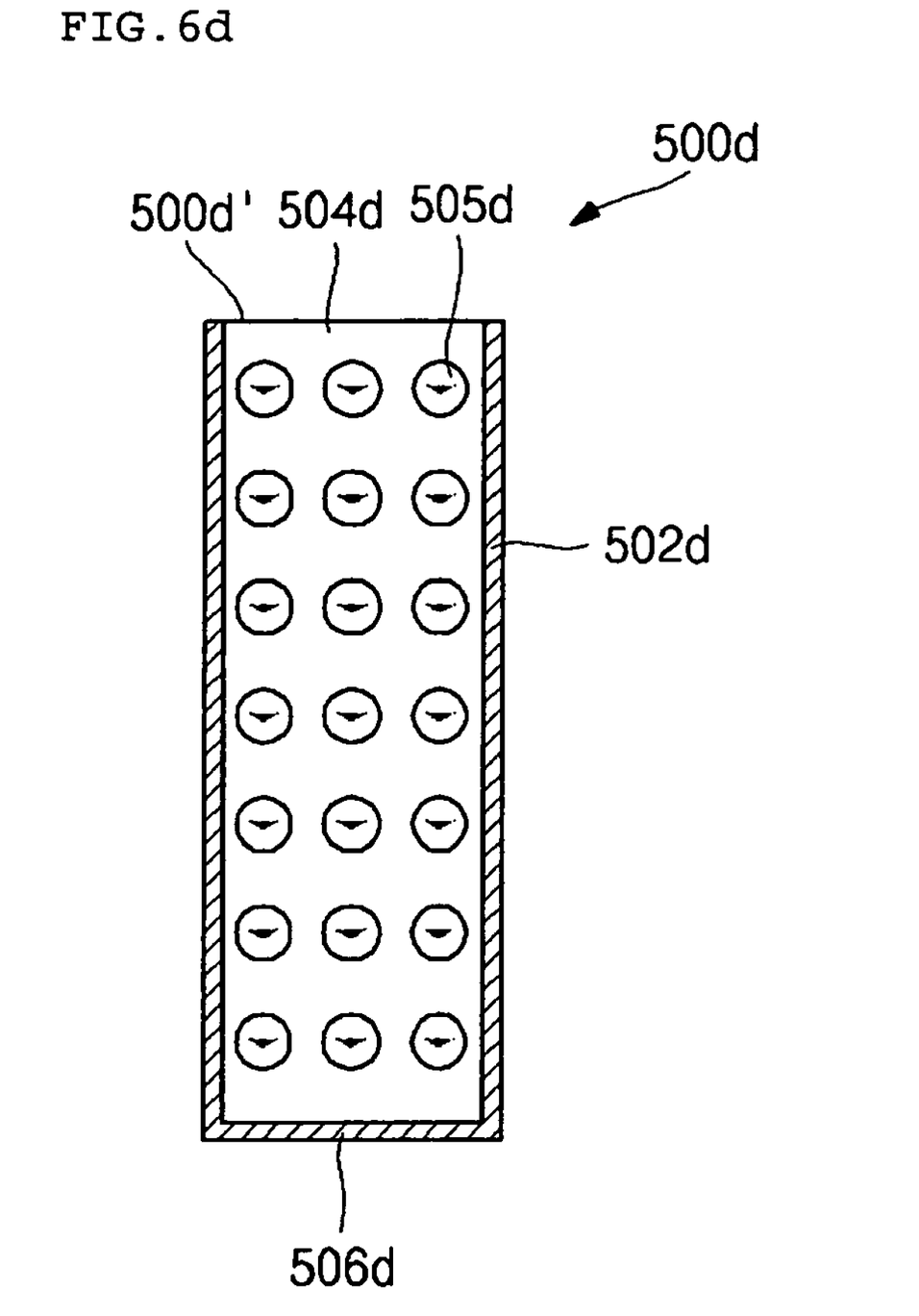
FIG. 6d is a sectional view illustrating a can for a lithium secondary battery according to still yet another embodiment of the invention.

FIG. 6a is a sectional view illustrating a can for a lithium secondary battery according to still yet another embodiment of the invention. The can 500 according to still yet another embodiment of the invention is fabricated in the form of a box including long-sidewalls 502, short-sidewalls 504 and a bottom wall 506, in which an upper portion of the can 500 is formed with an opening 500a. The short-sidewalls 504 are formed at inner surfaces thereof with a plurality of electrolyte slots 505, which are discontinuously arranged. A vertical section of the electrolyte slot 505 may have a rectangular, a triangular, a circular, or a semi-spherical shape. FIG. 6b shows an embodiment of a can 500b with a triangular electrolyte slot 505b, an opening 500b', long side-walls 502b, short-sidewalls 504b and a bottom wall 506b. FIG. 6c shows an embodiment of a can 500c with a circular electrolyte slot 505c, an opening 500c', long side-walls 502c, short-sidewalls 504c and a bottom wall 506c. FIG. 6d shows an embodiment of a can 500d with a semi-spherical electrolyte slot 505d, an opening 500d', long side-walls 502d, short-sidewalls 504d and a bottom wall 506d. However, the invention does not limit the sectional shape of the electrolyte slot 505. Herein, the vertical section of the electrolyte slot 505 refers to a section of the electrolyte slot 505 obtained by cutting the electrolyte slot in the longitudinal direction of the short-sidewalls 504. If the electrolyte slot 505 has the rectangular or triangular sectional shape, inner corners of the electrolyte slot 505 may be rounded with a predetermined curvature in the similar way as described above with reference to FIG. 3a. In addition, in one embodiment, outer edges of the electrolyte slot defined between sidewalls of the electrolyte slot and the inner surfaces of the short-sidewalls 504 may be also rounded with a predetermined curvature. The reason for this has already been explained in relation to the embodiment shown in FIG. 3a, so it will not be further described below.

In an embodiment, the electrolyte slot 505 may have a width or a diameter of at least 2 mm. If the width or the diameter of the electrolyte slot 505 is too small, the electrolyte may not easily flow along the electrolyte slot 505 due to surface tension. In addition, the interval between the electrolyte slots 505 is at least 2 mm. If the interval between the electrolyte slots 505 is too short, predetermined portions of the short-sidewalls 504 located between the electrolyte slots 505 may act as protrusions, which locally apply pressure to the electrode assembly 212, thereby causing damage to the electrode assembly 212. In an extreme case, the protrusions cause a short circuit between the electrode plates.

In addition, the electrolyte slot 505 has a depth less than 50% of the thickness of the short-sidewall 504 of the can 500. If the depth of the electrolyte slot 505 exceeds 50% of the thickness of the short-sidewall 504 of the can 500, the strength of the can 500 may be lowered, so that the can 500 is more susceptible external pressure or impact applied thereto and swelling is created in the can 500 during the operation of the lithium secondary battery.

Figure 7A:
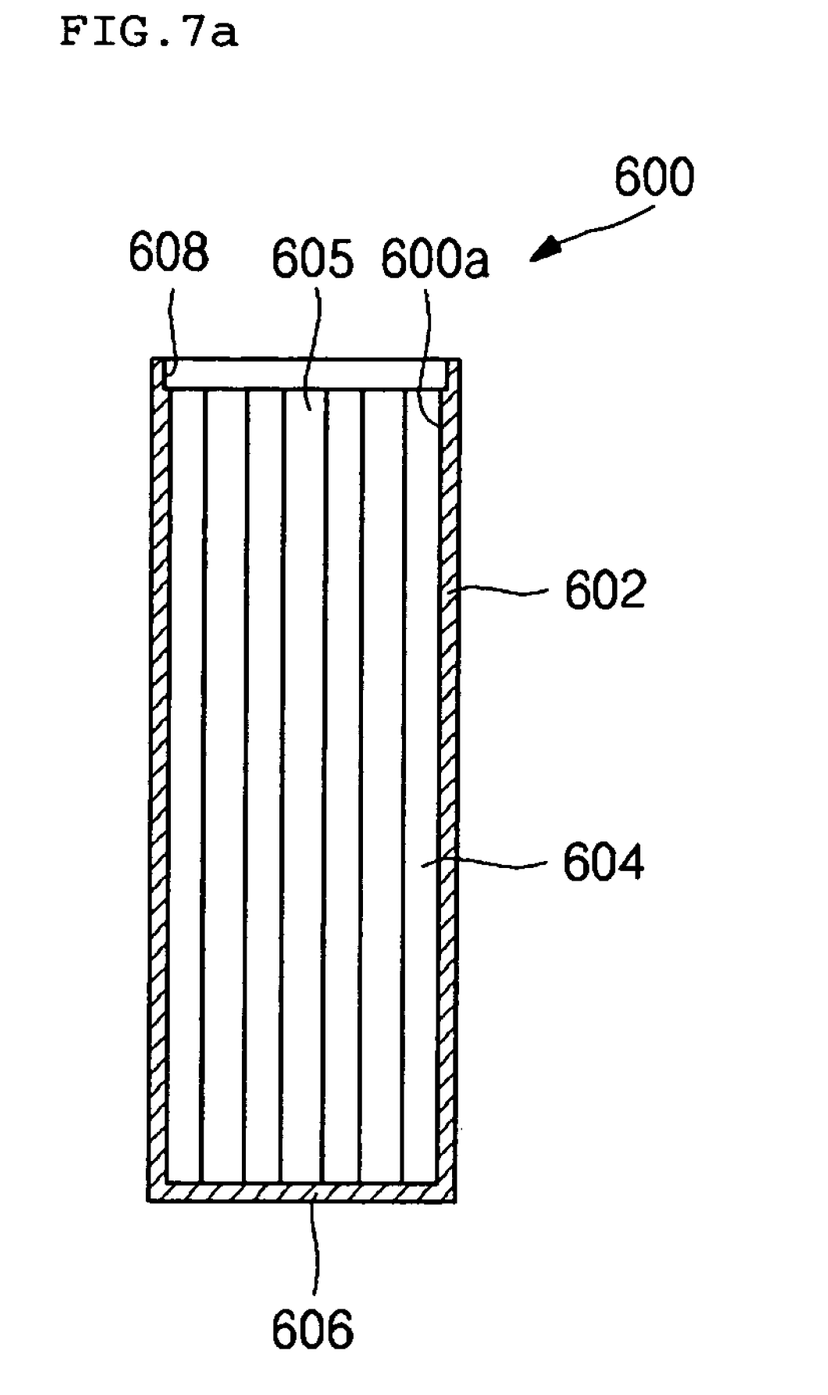
FIG. 7a is a sectional view illustrating a can for a lithium secondary battery according to still yet another embodiment of the invention.
Figure 7B:
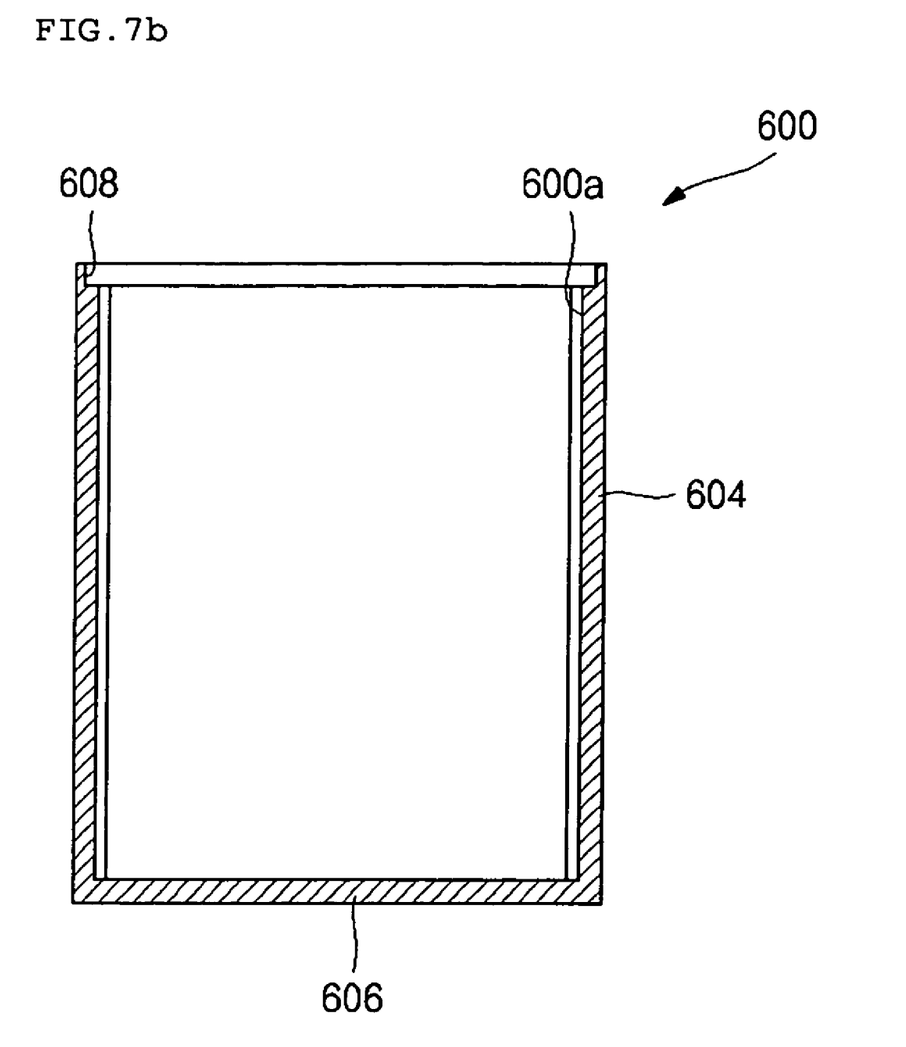
Figure 7C:
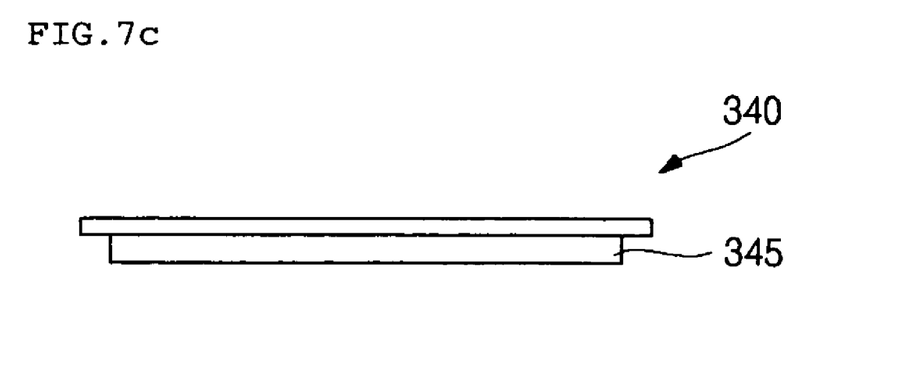

FIG. 7a is a sectional view illustrating a can for a lithium secondary battery according to still yet another embodiment of the invention, FIG. 7b is a longitudinal sectional view of the can shown in FIG. 7a, and FIG. 7c is a front view of a cap plate coupled with the can for the lithium secondary battery shown in FIG. 7a.

Referring to FIGS. 7a to 7c, the can 600 according to still yet another embodiment of the invention is fabricated in the form of a box including long-sidewalls 602, short-sidewalls 604 and a bottom wall 606, in which an upper portion of the can 600 is formed with an opening 600a. The can 600 is formed at an inner portion of the upper opening 600a thereof with a recess 608 having a predetermined depth for resting the cap plate 340 therein. If the cap plate 340 has a size corresponding to the size of the upper opening 600a of the can 600, the depth of the recess 608 corresponds to the thickness of the cap plate 340. In addition, as shown in FIG. 7c, if a cap plate 340 is provided at a lower surface thereof with a can coupling member 345, which has a size corresponding to the size of the upper opening 600a of the can 600 and is rested in the recess 608, the depth of the recess 608 corresponds to the thickness of the can coupling member 345 of the cap plate 340.

The short-sidewalls 604 of the can 600 are formed at inner surfaces thereof with electrolyte slots 605, which extend from a lower surface of the recess 608 to an upper surface of the bottom wall 606 of the can 600. The electrolyte slots 605 may have shapes substantially identical to those of the electrolyte slots 205, 305, 405 and 505 shown in FIGS. 3a to 6, so a detailed description thereof will be omitted below.

Figure 8A:
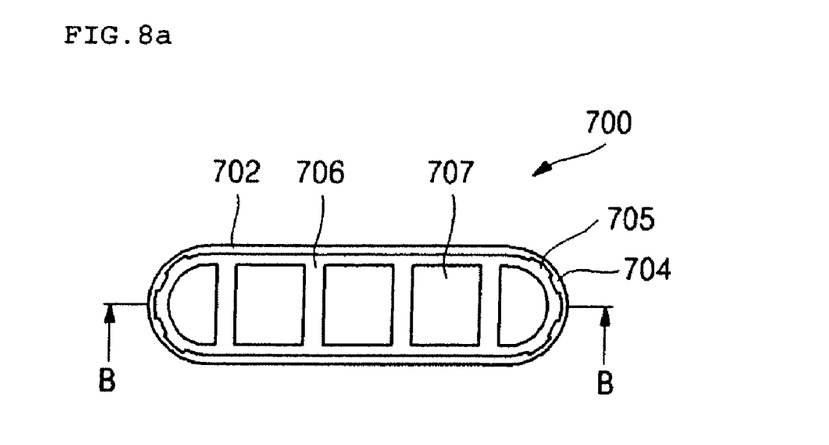
FIG. 8a is a plan view illustrating a can for a lithium secondary battery according to still yet another embodiment of the invention.
Figure 8B:
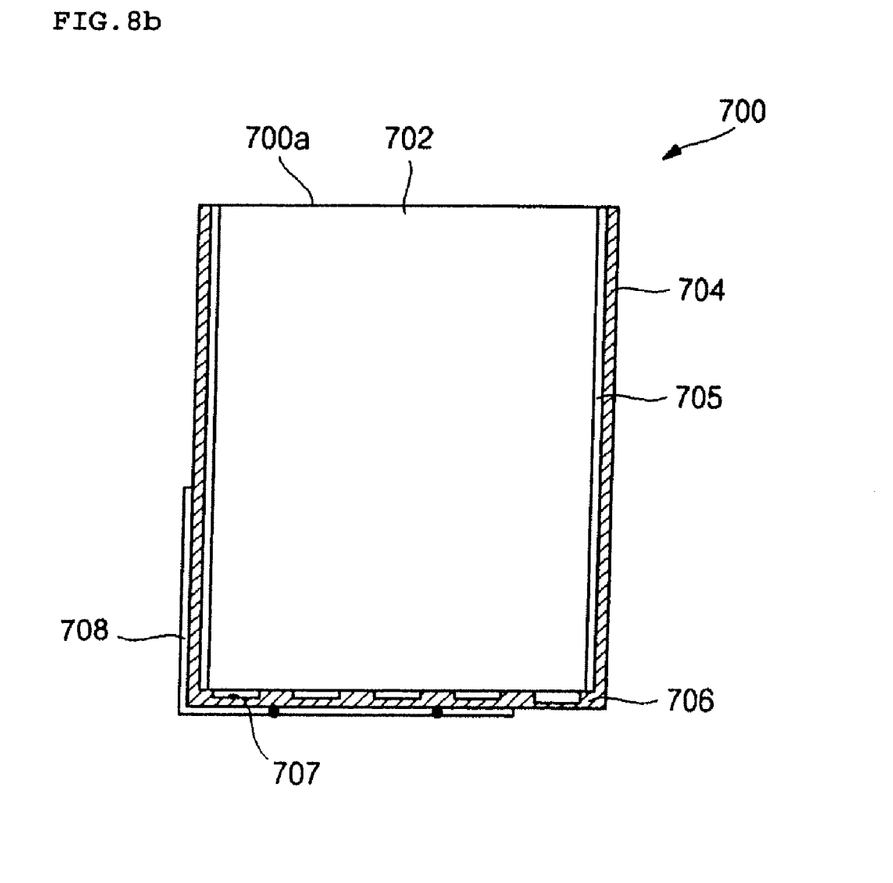

FIG. 8a is a plan view illustrating a can for a lithium secondary battery according to still yet another embodiment of the invention, and FIG. 8b is a sectional view taken along line B-B shown in FIG. 8a. The can 700 is fabricated in the form of a box including long-sidewalls 702, short-sidewalls 704 and a bottom wall 706, in which an upper portion of the can 700 is formed with an opening 700a. The short-sidewalls 704 are formed at inner surfaces thereof with a plurality of electrolyte slots 705. The electrolyte slots 705 are prepared in the form of trenches, which extend from upper end portions of the short-sidewalls 704 to lower end portions of the short-sidewalls 704, that is, to an upper surface of the bottom wall 706. In addition, the bottom wall 706 is formed at the upper surface thereof with at least one electrolyte slot 707 having a predetermined shape. A horizontal section of the electrolyte slot 707 may have a rectangular, a triangular, a circular, or a semi-spherical shape. Plural electrolyte slots 707 can be formed on the upper surface of the bottom wall 706 with various sectional shapes, if it is necessary. However, the invention does not limit the sectional shape of the electrolyte slot 707. For instance, in one embodiment, the electrolyte slot 707 may have a pentagonal shape or a hexagonal shape. In addition, in another embodiment, if the electrolyte slot 707 has the rectangular or triangular sectional shape, inner corners of the electrolyte slot 707 may be rounded with a predetermined curvature. In addition, in yet another embodiment, outer edges of the electrolyte slot 707 connected to the bottom wall 706 are also rounded with a predetermined curvature. The interval between the electrolyte slots 707 is at least 2 mm and the width or the diameter of the electrolyte slot 707 is at least 2 mm. The electrolyte slot 707 may have a depth less than 50% of the thickness of the bottom wall 706 of the can 700. The reason for this has already been explained above, so it will not be further described below.

A lead plate 708 can be welded to an outer surface of the bottom wall 706 of the can 700 depending on the type of the lithium secondary batteries in order to electrically connect the can 700 with a protective circuit module (not shown). The electrolyte slot 707 is not formed in a welding portion of the bottom wall 706 prepared for the lead plate 708. If the electrolyte slot 707 is formed in the welded portion of the bottom wall 706, the thickness of the welding portion may be reduced, so cracking may occur in the welding portion during the welding process.

As described above, the can for the lithium secondary battery according to the invention is formed at the inner portion thereof with the electrolyte slots having predetermined shapes. Accordingly, when the electrolyte is injected into the can having the electrode assembly therein after the cap assembly has been welded to the upper end portion of the can, the electrolyte can be easily introduced into the can along the electrolyte slots.

In addition, according to the invention, since the electrolyte slots are filled with the electrolyte that has been injected into the can, the amount of the electrolyte contained in the can may be increased, thereby improving capacity of the lithium secondary battery.

Although several embodiments of the invention have been described for illustrative purposes, those skilled in the art will appreciate that various modifications, additions and substitutions are possible, without departing from the scope and spirit of the invention as disclosed in the accompanying claims.

What is claimed is:

1. A can for a lithium secondary battery comprising:
   long-sidewalls having long-sidewall upper ends and long-sidewall lower ends;
   short-sidewalls having short-sidewall upper ends and short-sidewall lower ends, at least one of the short-sidewalls having at least one electrolyte slot being a trench on an inner surface of the at least one short-sidewall and extending from the short-sidewall upper end to the short-sidewall lower end of the at least one short-sidewall; and
   a bottom wall;
   wherein the long-sidewall lower ends and the short-sidewall lower ends are connected to the bottom wall and the long-sidewalls are connected to the short-sidewalls to define an opening at the long-sidewall upper ends and the short-sidewall upper ends, wherein the can is configured to receive an electrode assembly through the opening and contain the electrode assembly and an electrolyte therein, said electrode assembly having a first electrode plate, a second electrode plate, and a separator between the first and second electrode plates, and wherein the can is configured to be coupled to a cap assembly for sealing the opening of the can.

2. The can as claimed in claim 1, further comprising:

a recess at an inner portion of the long-sidewall and short-sidewall upper ends, the recess having a depth for receiving a cap plate of the cap assembly therein, wherein the at least one electrolyte slot extends from a lower surface defining the recess toward the bottom wall.

3. The can as claimed in claim 2, wherein the depth of the recess corresponds to a thickness of the cap plate.

4. The can as claimed in claim 2, wherein the cap plate comprises a can coupling member having a size corresponding to a size of the opening of the can for coupling with the can at the opening, and the depth of the recess corresponds to a thickness of the can coupling member.

5. The can as claimed in claim 1, wherein the at least one electrolyte slot comprises a plurality of electrolyte slots spaced apart from each other by an interval.

6. The can as claimed in claim 1, wherein the at least one electrolyte slot is on the inner surface of the at least one short-sidewall in the form of a diagonal trench or a vertical trench.

7. The can as claimed in claim 1, wherein the at least one electrolyte slot is on the inner surface of the at least one short-sidewall in the form of a horizontal trench.

8. The can as claimed in claim 1, wherein the at least one electrolyte slot comprises outer edges and an inner corner and has a cross-section having a rectangular shape, a triangular shape, or an arc shape.

9. The can as claimed in claim 8, wherein the cross-section of the at least one electrolyte slot has the rectangular shape or the triangular shape, and the inner corner of the electrolyte slot is rounded with a curvature.

10. The can as claimed in claim 8, wherein the outer edges of the at least one electrolyte slot are rounded with a curvature.

11. The can as claimed in claim 1, wherein the at least one electrolyte slot has a width of at least 2 mm.

12. The can as claimed in claim 5, wherein the interval is at least 2 mm.

13. The can as claimed in claim 1, further comprising a plurality of electrolyte slots having inner corners and outer edges, electrolyte slots of the plurality of electrolyte slots being discontinuously formed at an inner surface of at least one of the short-sidewalls.

14. The can as claimed in claim 13, wherein electrolyte slots of the plurality of electrolyte slots have a rectangular sectional shape, a triangular sectional shape, a circular sectional shape or a semi-spherical sectional shape.

15. The can as claimed in claim 14, wherein, the electrolyte slots of the plurality of electrolyte slots have the rectangular sectional shape or the triangular sectional shape, and an inner corner that is rounded with a curvature.

16. The can as claimed in claim 13, wherein outer edges of electrolyte slots of the plurality of electrolyte slots are rounded with a curvature, the outer edges being connected to the at least one short-sidewall.

17. The can as claimed in claim 13, wherein an electrolyte slot of the plurality of electrolyte slots has a width or a diameter of at least 2 mm.

18. The can as claimed in claim 13, wherein an interval between electrolyte slots of the plurality of electrolyte slots is at least 2 mm.

19. The can as claimed in claim 1, wherein a depth of the at least one electrolyte slot is less than 50% of a thickness of the at least one short-sidewall.

20. The can as claimed in claim 1, wherein the first electrode plate is a negative electrode plate and the second electrode plate is a positive electrode plate.

* * * * *